United States Patent [19]

Kharrazi

[11] 4,434,184

[45] Feb. 28, 1984

[54] YOGURT SPREAD RESEMBLING CREAM CHEESE

[76] Inventor: N. Michael Kharrazi, 55 S. La Cumbre Rd., Santa Barbara, Calif. 93105

[21] Appl. No.: 449,431

[22] Filed: Dec. 13, 1982

[51] Int. Cl.$^3$ .................. A23C 9/12; A23C 19/076; A23C 20/00

[52] U.S. Cl. ................................... 426/40; 426/36; 426/43; 426/582; 426/583

[58] Field of Search ............... 426/34, 40, 583, 36, 426/41, 582, 43

[56] References Cited

U.S. PATENT DOCUMENTS

| | | | |
|---|---|---|---|
| 2,871,126 | 1/1959 | Smith et al. | 426/36 |
| 3,492,129 | 1/1970 | Carswell et al. | 426/40 |
| 3,932,680 | 1/1976 | Egli et al. | 426/34 |
| 4,022,914 | 5/1977 | Moody | 426/34 |
| 4,362,749 | 12/1982 | Sozzi | 426/36 |
| 4,366,174 | 12/1982 | Kneubuehl et al. | 426/36 |

FOREIGN PATENT DOCUMENTS 1141950  2/1969  United Kingdom ............... 426/583

OTHER PUBLICATIONS

Webb et al., Byproducts from Milk, 1970, AVI Publ. Co., pp. 37–40.

*Primary Examiner*—David M. Naff
*Assistant Examiner*—Marianne S. Minnick
*Attorney, Agent, or Firm*—Jack C. Munro

[57] ABSTRACT

A yogurt spread is produced which resembles conventional cream cheese in appearance, texture and taste, but which has a fat content substantially below that of conventional cream cheese and imitation cream cheese products. The yogurt spread is produced by preparing a yogurt with yogurt starter, mixing with the yogurt a brine solution containing about 3–12% salt in an amount of about one-fourth to equal by volume of the yogurt, and centrifuging the resultant mixture of yogurt and brine solution to remove the bulk of whey therefrom to obtain said spread resembling cream cheese.

6 Claims, No Drawings

YOGURT SPREAD RESEMBLING CREAM CHEESE

BACKGROUND OF THE INVENTION

The field of this invention relates generally to a method of making a yogurt spread which has the appearance, taste, consistency and texture of cream cheese, but has a fat content significantly below that of conventional cream cheese.

In recent years, for health as well as cosmetic reasons, there has developed an increasing concern with diet which is focused on diets which reduce calorie and fat consumption. Low calorie foods which look and taste like their higher calorie counterparts have been eagerly sought by the public. To this end, food researchers have concentrated on developing food products which are nutritious and palatable, but which contains substantially reduced levels of calories and/or fat. This has been particularly true in the early industry where such low calorie, low fat products as skim milk, yogurt and the like have been successfully marketed.

However, the high fat levels in some dairy products, such as cream cheese, have heretofore been thought to be necessary to maintain a desirable creamy mouth feel. As a result, those individuals choosing to reduce their calorie or fat intake have usually omitted high fat dairy products, such as cream cheese, from their diets.

Previously there have been efforts to prepare cream cheeses which are low in fat. Conventional cream cheese has a fat of thirty five to forty percent. Heretofore, methods to reduce the fat quantity of a cream cheese have produced "immitation" cheeses with a fat content of ten to fifteen percent. Although this is a substantial reduction, it has been found that of those desiring or required to reduce their calorie and/or fat intake, that a ten to fifteen percent fat content is still undesirable.

Previous to the present invention, it is believed that all prior effort toward the arriving at of a imitation cream cheese would utilize as the basic component a cheese product, such as cottage cheese curd. It is not believed to have been known within the prior art to utilize yogurt as the base for the producing of a substance which has the consistency, appearance, taste and texture of conventional cream cheese.

SUMMARY OF THE INVENTION

The primary objective of the present invention is to provide a cream cheese type of product which resembles conventional cream cheese in appearance, texture and taste, but which has a fat content substantially below that of conventional cream cheese and imitation cream cheese products. Also, the product could resemble conventional "sour cream" by including more moisture.

It is another object of the present invention to provide a nutritious, palatable cream cheese type of product which has a creamy mouth feel similar to conventional cream cheese, but which has a fat content of between three and ten percent of conventional cream cheese.

It is another object of the present invention to provide a method for making the cream cheese type of product of the present invention.

In accordance with the aforesaid objectives, the present invention utilizes a process for making a low calorie, low fat cream cheese type of product resembling cream cheese in appearance, texture and taste, which includes the step of utilizing a quantity of liquid milk, heating the liquid milk to a temperature of approximately one hundred and eighty degrees Fahrenheit, cooling the milk to approximately one hundred and seven degrees Fahrenheit, evenly mixing a quantity of yogurt starter culture to the cooled milk and providing sufficient time for the resulting mixture to form yogurt, mixing a quantity of the brine solution evenly with the yogurt, adding whatever flavorants are desired and removing the bulk of the moisture (whey) from the resulting mixture until the desired consistency is obtained. The resulting product is then molded and packaged into convenient shapes and in a conventional manner. The product of the present invention is principally yogurt which has a total fat content of generally less than five percent and usually about three percent. The product contains about twenty to twenty five calories per ounce and approximately thirteen percent crude protein.

DETAILED DESCRIPTION OF THE INVENTION

The present invention broadly relates to a soft, cream cheese type of product which resembles cream cheese in appearance, texture and taste and which has a fat content which is substantially reduced below that of conventional cream cheeses. The spread of the present invention is constructed principally of yogurt which is known to be highly nutritious and also highly desirable by those who wish to decrease their caloric intake and to reduce fat content of their diet.

The process by which the unique spread of the present invention is made, utilizes a mixture of milk as a basic ingredient. The milk can be either reconstituted powdered, regular, low fat or skim (non-fat). The milk is to be heated to within the range of one hundred and seventy to two hundred and twelve degrees Fahrenheit. However, a satisfactory temperature would be approximately one hundred and eighty degrees Fahrenheit. It is not necessary to maintain the heating of the milk for any great length of time. It is only necessary for the milk to reach the desired temperature which will cause the bacteria contained within the milk to be destroyed.

The milk is then to be cooled to within the range of one hundred and five to one hundred and nine degrees Fahrenheit with the preferable temperature setting to be established at one hundred and seven degrees Fahrenheit. It is important to the subject invention that this temperature range be precisely controlled.

To the milk mixture, there is evenly mixed a quantity of a yogurt starter culture. Only a very minute amount of this culture need be necessary. As a general rule, from one half percent to three percent of yogurt starter is added to the milk. Satisfactory yogurt starters Lactobacillus bulgaricus, Streptococcus thermophilus or Lactobacillus acidophilus.

The milk mixture is then permitted to set for a period of time. Generally the desired period of time would be six to eight hours while maintaining the temperature within the desired temperature range of one hundred and five and one hundred and nine degrees Fahrenheit. At this particular time, the resulting mixture is termed yogurt.

The yogurt mixture is no longer necessary to be held within the hundred and five to one hundred and seven degree Fahrenheit range. Evenly mixed with this yogurt is a quantity of a brine solution. The brine solution contains three to twelve percent of salt. It is normally desired that the amount of the brine solution will be one-fourth to equal in by volume of the yogurt.

Also at this particular time, if it is desired that the resulting product is to have a whipped consistency, a quantity of a natural gum, such as guar or xanthan is to be added. It is to be understood that the quantity of the gum would be rather minute, but is to be substantially evenly distributed. Also a gas, such as nitrous oxide is to be added to the mixture in a conventional manner.

The non-whipped product is obtained by removing the bulk of the whey from the product through the use of either pressure or a centrifuge. The vast majority of the whey is removed until a desired consistency, that of cream cheese, is obtained.

At this particular time, it may be desirable to add flavors, such as fruit flavors, dehydrated and/or garlic, onion, herb and spices. Also, a sweetner could be added if such is desired. It also may be desired to add a butter flavor. Also, natural emulsifiers could be added.

If the product is to be whipped, the whipping procedure is to be initiated after the removal of the whey. It is to be understood that the aforementioned gum and nitrous oxide have been previously added. This product can then be packaged and dispensed either in aerosol form or in a container. An illustrative example of the yogurt spread of this invention is as follows. To one gallon of milk, which has been heated momentarily to one hundred and eighty degrees Fahrenheit and then cooled to one hundred and seven degrees Fahrenheit, four tablespoons of yogurt starter is thoroughly mixed. The mixture is covered and left setting for six to eight hours, at which time one quart of brine which contains one ounce of salt is added. Then one-sixteenth of an ounce of butter flavor is added. This is mixed thoroughly. Excess moisture (whey and some brine) is removed to a desired consistency. This resulting base product (yogurt spread) can be used by itself as a cream cheese (less moisture) or sour cream (more moisture), evolved into whipped yogurt products or party dips.

What is claimed is:

1. The method of making a yogurt spread having the consistency of cream cheese and about 3–10% of the fat content of conventional cream cheese comprising the steps of:
   utilizing a quantity of liquid milk;
   heating the milk to a temperature of approximately one hundred and eighty degrees Fahrenheit;
   cooling the milk to approximately one hundred and seven degrees Fahrenheit;
   evenly mixing a quantity of yogurt starter culture to the cooled milk and providing sufficient time for the resulting mixture to form yogurt;
   evenly mixing with the yogurt a brine solution containing about 3% to about 12% of salt in an amount of about one-fourth to about equal by volume of the yogurt; and
   centrifuging the resulting mixture of yogurt and brine to remove the bulk of whey therefrom to obtain said cream cheese consistency.

2. The method as defined in claim 1 wherein between the step of mixing with brine and the step of whey removal there is the additional step of adding flavors to the yogurt.

3. The method as defined in claim 1 wherein the yogurt starter culture is selected from the group consisting of Lactobacillus bulgaricus, Streptococcus thermophilus and Lactobacillus acidophilus.

4. The method as defined in claim 3 wherein there is added between the step of mixing with brine and the step of removing whey a quantity of natural gum plus nitrous oxide and after the step of removing whey there is utilized the additional step of whipping the resulting yogurt mixture.

5. A yogurt spread prepared by the method of claim 1.

6. A yogurt spread prepared by the method of claim 4.

* * * * *